United States Patent
Holman

(10) Patent No.: US 10,832,109 B2
(45) Date of Patent: *Nov. 10, 2020

(54) LASER LIGHT DETECTION AND BARCODE DISPLAY AT MOBILE PHONE

(71) Applicant: T-Mobile USA, Inc., Bellevue, WA (US)

(72) Inventor: Jacob Holman, Bonney Lake, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,416

(22) Filed: Oct. 17, 2019

(65) Prior Publication Data

US 2020/0057927 A1 Feb. 20, 2020

Related U.S. Application Data

(63) Continuation of application No. 16/009,169, filed on Jun. 14, 2018, now Pat. No. 10,496,909.

(51) Int. Cl.
 *G06K 7/10* (2006.01)
 *G06K 19/06* (2006.01)
(52) U.S. Cl.
 CPC .............. *G06K 19/06028* (2013.01)
(58) Field of Classification Search
 USPC ............... 235/462.01, 472.01, 494
 See application file for complete search history.

(56) References Cited

U.S. PATENT DOCUMENTS

| 9,194,746 | B1 | 11/2015 | Reda et al. |
| 9,922,224 | B1 | 3/2018 | Nambudiri |
| 10,496,909 | B1 | 12/2019 | Holman |
| 2007/0133876 | A1* | 6/2007 | Chande .............. G06F 40/174 382/181 |

(Continued)

FOREIGN PATENT DOCUMENTS

| EP | 3276555 A1 | 1/2018 |
| KR | 101563135 B1 | 10/2015 |

OTHER PUBLICATIONS

International Searching Authority, International Search Report and Written Opinion, PCT Patent Application PCT/US2019/037387, dated Oct. 4, 2019, 13 pages.

*Primary Examiner* — Tuyen K Vo
(74) *Attorney, Agent, or Firm* — Perkins Coie LLP

(57) ABSTRACT

Systems and methods for utilizing one or more cameras at a mobile device to assist in the implementing anti-counterfeit measures for digital barcodes are disclosed. For example, the systems and methods use a mobile device's front camera to capture photographs (or images) at a certain frequency (e.g., capture a photograph every 0.20 seconds). The systems and methods then scan the captured photograph and retrieve relevant image data (for example, scan image vertically and utilize image data of every fourth pixel). The systems and methods compare certain properties of the retrieved image data with properties of one or more comparison light sources. When the systems and methods detect a match (for example, a match within certain threshold parameters), they identify a barcode among a set of barcodes and display the identified barcode at a display screen of the mobile device.

20 Claims, 9 Drawing Sheets

(56) References Cited

U.S. PATENT DOCUMENTS

| | | |
|---|---|---|
| 2012/0128340 A1 | 5/2012 | Lai |
| 2012/0173347 A1 | 7/2012 | De Almeida Neves et al. |
| 2012/0312877 A1 | 12/2012 | Zolotov |
| 2013/0240622 A1 | 9/2013 | Zhou et al. |
| 2014/0147122 A1* | 5/2014 | Ahmed ............... H04W 12/003 398/106 |
| 2015/0213349 A1* | 7/2015 | Downing ............. G07D 7/1205 235/375 |
| 2016/0253656 A1* | 9/2016 | Dragushan ............. G06Q 30/06 705/71 |
| 2018/0053027 A1* | 2/2018 | Todeschini ........... G06K 7/1413 |

* cited by examiner

LASER LIGHT DETECTION AND BARCODE DISPLAY AT MOBILE PHONE

CROSS-REFERENCES TO RELATED APPLICATIONS

This application is a continuation of U.S. patent application Ser. No. 16/009,169, filed on Jun. 14, 2018, and entitled "LASER LIGHT DETECTION AND BARCODE DISPLAY AT MOBILE PHONE," the disclosure of which is hereby incorporated herein in its entirety by reference.

BACKGROUND

A barcode is an optical, machine-readable, representation of data; the data usually describes something about the object that carries the barcode. Barcodes are ubiquitous in automated supermarket checkout systems and their use has spread to many other tasks that are generically referred to as automatic identification and data capture (AIDC). QR codes, a specific type of 2D barcode, have recently become very popular. A QR code consists of black squares arranged in a square grid on a white background, which can be read by an imaging device such as a camera, and processed using Reed-Solomon error correction until the image can be appropriately interpreted. The required data is then extracted from patterns that are present in both horizontal and vertical components of the image. QR codes may be used to display text to the user, to add a vCard contact to the user's device, to open a Uniform Resource Identifier (URI), or to compose an email or text message. QR codes have become common in consumer advertising. QR codes can also be used to store bank account information or credit card information, or they can be specifically designed to work with particular payment provider applications.

Typically, a smartphone is used as a QR code scanner, displaying the code and converting it to some useful form (such as a standard URL for a website, thereby obviating the need for a user to type the URL into a web browser). QR codes have become a focus of advertising strategy, since they provide a way to access a brand's website more quickly than by manually entering a URL. Barcodes and QR codes are used over a wide range of applications, including commercial tracking, entertainment and transport ticketing, product and loyalty marketing, etc. One example is mobile couponing where a company's discount can be captured and decoded using a barcode or QR code decoder in a mobile app. In another example, a company's information such as address and related information is stored alongside its alphanumeric text data (e.g. as can be seen in the Yellow Pages directory).

However, the increased use of barcodes and QR codes in a wide variety of applications has made them a target for hacking attacks. At its most straightforward, currently it is easy to copy "used" barcodes (for example, by making a photocopy) and print them out. Hackers can also impermissibly share digital barcodes using screen capture methods (e.g., taking a photograph of a barcode and then reusing it multiple times). Freely-available computer programs allow hackers to decode or write barcodes. While readers and scanners for two-dimensional barcodes are still comparatively expensive, once they are obtained, these devices are easy to reconfigure. This hacking approach might be applied to copy and/or print airline boarding cards, event tickets (e.g., concert tickets), coupons, vouchers for free items, membership cards, secure access cards, and so on. As a result, companies offering services using digital barcodes suffer substantial economic and productivity losses. These and other problems exist with the use of barcodes and AIDC.

BRIEF DESCRIPTION OF THE DRAWINGS

Embodiments of the disclosed technology will be described and explained through the use of the accompanying drawings.

Figure 1:
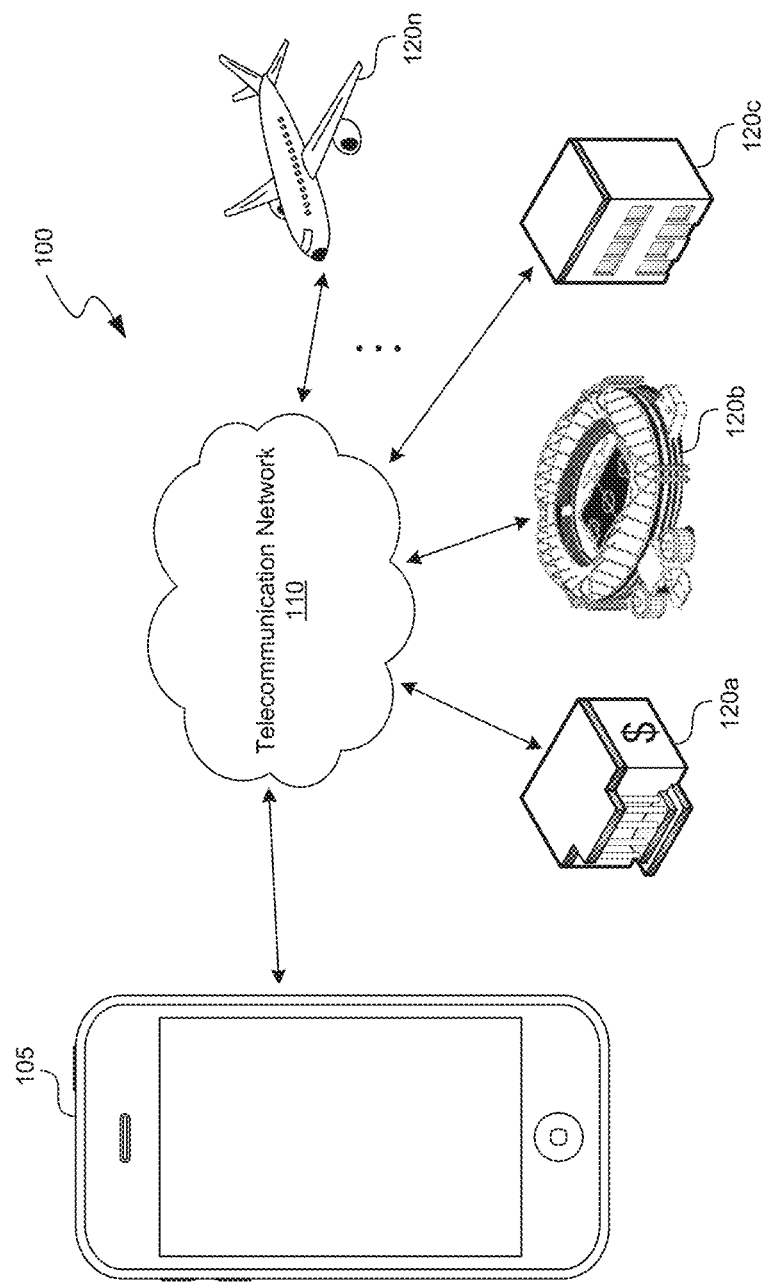
FIG. 1 is a diagram of a representative environment in which a system displays a barcode at a mobile device in response to detecting a laser light using the device's camera.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In light of the above problems, as well as others, the inventors have recognized that it would be beneficial to deter digital barcode fraud by implementing anti-counterfeit measures. Systems and methods are described herein for utilizing one or more cameras at a mobile device to assist in implementing such anti-counterfeit measures. For example, the systems and methods use a mobile device's front camera to capture photographs (or images) at a certain frequency (e.g., capture a photograph every 0.20 seconds). The systems and methods then scan the captured photograph and retrieve relevant image data (for example, scan image vertically and utilize image data of every fourth pixel). The systems and methods compare certain characteristics of the retrieved image data (for example, one or more of brightness, bit depth, luminance, color, color space, intensity/luminosity, hue, tint, saturation, shade, tone, lightness, chromatic signal, grayscale, and so on) with characteristics of one or more comparison light sources. Examples of comparison light sources include, but are not limited to, light sources that emit light beams in the form of red laser light, green laser light, blue laser light, yellow laser light, infrared light, and so on (for example, light from a laser barcode scanner). The systems and methods may compare the color and brightness of the retrieved image data with the expected color and brightness associated with a red laser light barcode scanner.

When the systems and methods detect a match (for example, a match within certain threshold parameters), only then do they display a barcode at a display screen of the mobile device, or identify a particular barcode selected from among a set of barcodes. For example, based on the information currently being displayed on the mobile device (for example, a certain mobile application page), the systems and methods can display a corresponding barcode for that displayed information. In this way, the systems and methods only display a bar code when the mobile device detects that a laser barcode scanner is scanning the display screen of the phone. As an example, when the mobile device is displaying information related to a merchant and the systems and methods detect and match an appropriate light source being shone on the mobile device, the systems and methods can then display a barcode associated with that particular merchant on the display screen. In several embodiments, the barcode can be displayed in a superimposed manner with the currently displayed information at the mobile device (for example, as discussed later in reference to FIG. 5C). When the systems and methods do not detect a match, they prevent the display of the barcode, thus deterring digital barcode fraud.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a diagram of a representative environment 100 in which a system to detect a particular light source and upon finding a match, displaying a corresponding barcode may operate. Although not required, aspects and implementations of the system will be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

In the environment 100, mobile device 105 may interact with one or more service providers such as banking institutions 120a, theaters/sports arenas/concert arenas 120b, merchant stores 120c, airlines 120n, and so on via telecommunications network 110. Telecommunications network 110 may be any telecommunications network capable of facilitating the transfer of telephone calls between mobile devices of a caller and a call recipient, including for example an IMS network. IMS is an architectural framework for delivering Internet Protocol ("IP") multimedia to mobile users, such as users of mobile devices like smart phones or tablet computers. An IMS core network ("IMS core") permits wireless and wireline devices to access multimedia, messaging, and voice applications and services. IMS standards and specifications have been promulgated by the 3rd Generation Partnership Project ("3GPP"™). To allow the IMS core to be integrated with Internet resources, the 3GPP specifications use Internet Engineering Task Force protocols within the IMS core, such as Session Initiation Protocol ("SIP") and Diameter. SIP is a signaling protocol used for creating, modifying and terminating two-party or multiparty sessions consisting of one or several media streams. Mobile device 105 can interact with and/or avail services associated with the one or more service providers using barcodes. For example, mobile device 105 uses a barcode to gain access to a concert being held at a concert arena 120b. As another example, mobile device 105 uses a barcode coupon to redeem an offer with a pizza merchant 120c.

Figure 2:
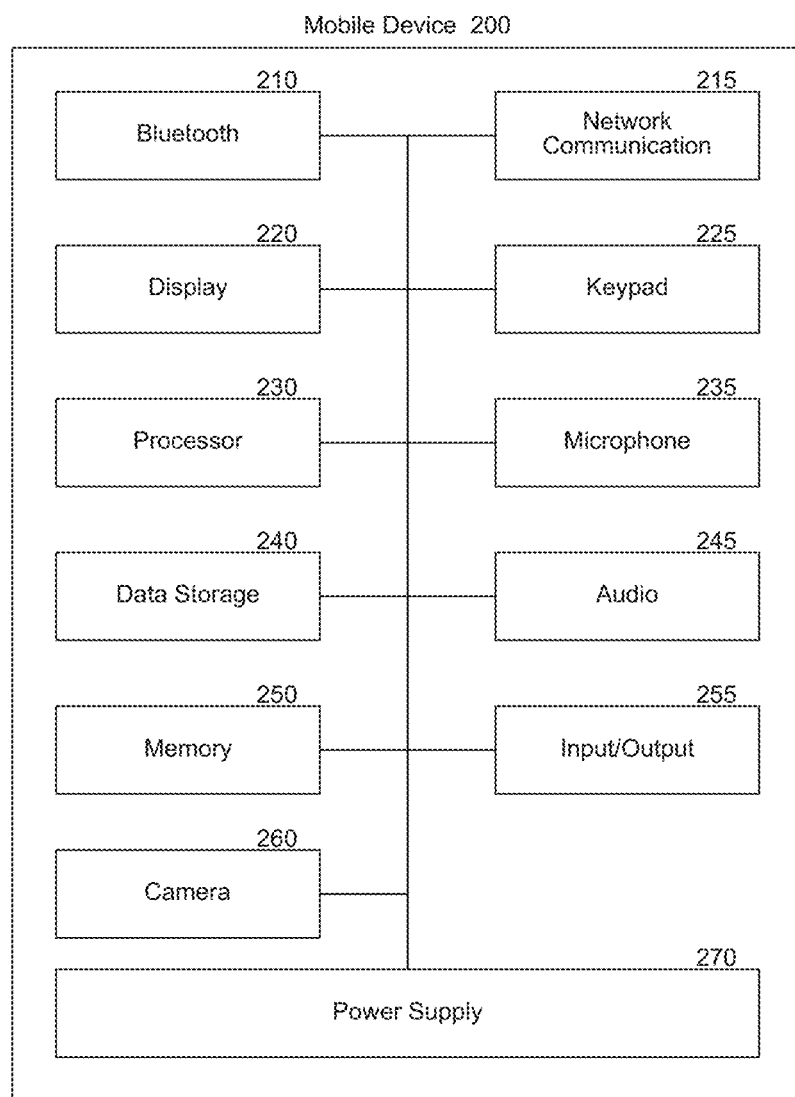
FIG. 2 is a block diagram of a representative mobile device that may serve as a handset on which the barcode is displayed.

FIG. 2 is a block diagram of a representative mobile device that may serve as a handset on which the barcode is displayed in accordance with embodiments herein. Mobile device 200 typically includes a processor 230 for executing processing instructions, a data storage medium component 240 (e.g., hard drive, flash memory, memory card, etc.), volatile memory and/or nonvolatile memory 250, a power supply 270, one or more network interfaces (e.g., Bluetooth Interface 210; and Network Communication Interface 215, which enables the mobile phone to communicate by transmitting and receiving wireless signals using licensed, semi-licensed or unlicensed spectrum over a telecommunications network), an audio interface 245, a display 220, a keypad or keyboard 225, a microphone 235, one or more cameras 260, and other input and/or output interfaces 255. The various components of the mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP or Diameter protocol clients capable of generating, transmitting and interpreting syntactically correct SIP or Diameter protocol messages. SIP clients permit the mobile device to register with and communicate via the IMS network.

Mobile device 200 may be virtually any device for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Mobile device 200 may connect to a telecommunications network via a trusted radio access network (RAN) or an untrusted RAN. A single mobile device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, 5G, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), any of the IEEE 802.11 WLAN protocols, High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Figure 3A:
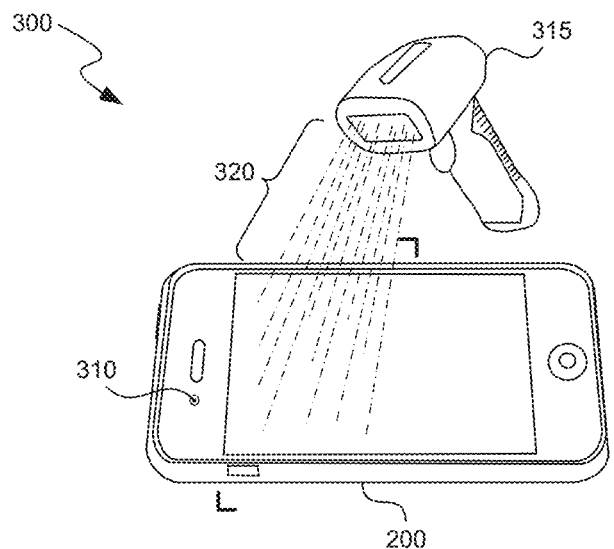
FIGS. 3A and 3B are display diagrams illustrating a representative environment for using a barcode scanner to detect a barcode at a mobile device.
Figure 3B:
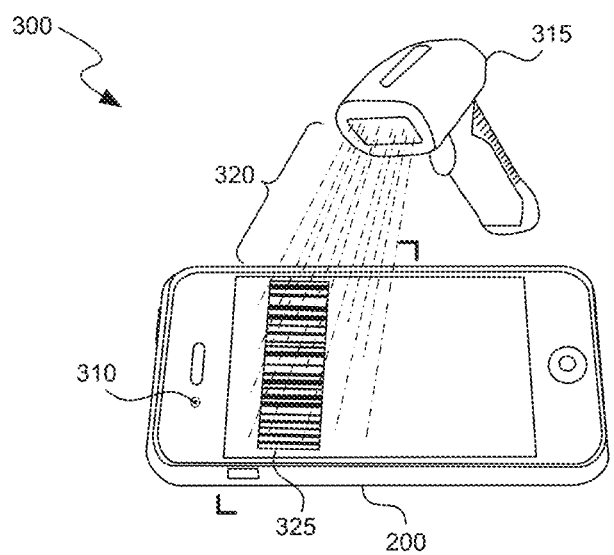

FIGS. 3A and 3B are display diagrams illustrating a representative environment 300 for using a barcode scanner to detect a barcode at a mobile device in accordance with embodiments disclosed herein. In environment 300, a barcode scanner (for example, a laser barcode scanner with a red laser light source) 315 can shine laser light beams 320 at a mobile device 200 in order to read and scan a barcode. Mobile device 305 includes one or more cameras (for example, front camera 310). Mobile device 305 captures photographs/images using the one or more cameras (and/or any other mobile device sensors). Using the captured photographs/images, the mobile device 305 determines whether a particular bar code is to be displayed at the mobile device. For example, when the mobile device 305 detects a laser light beam 320 and matches it to an expected laser light beam source (for example, red laser light barcode scanner), mobile device 305 displays a corresponding barcode 325.

Figure 4A:
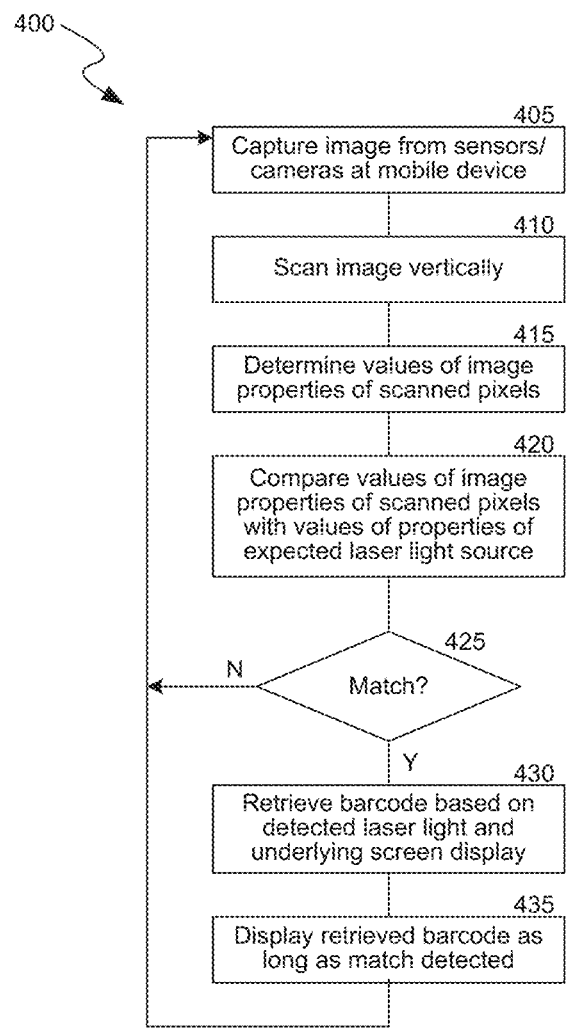
FIG. 4A is a flow diagram illustrating a method of displaying a barcode in response to detecting a specific light beam at a mobile device.

FIG. 4A is a flow diagram illustrating a process 400 of displaying a barcode in response to detecting a specific light beam at a mobile device in accordance with some embodiments disclosed herein. Some or all of the acts described in FIGS. 4A and 4B may be performed at a mobile device (for example, mobile device 200 depicted in FIG. 2). At block 405, process 400 captures photographs/images from one or more sensors/cameras at a mobile device. For example, process 400 captures photographs/images using the mobile device's front camera at a particular time interval. The particular time interval can be a default value (predetermined) and/or can be determined dynamically based on one or more parameters, such as specification/attributes of the mobile device, value of items associated with a barcode that is to be displayed, merchant whose barcode is to be displayed, location of mobile device, user of mobile device, telecommunications network associated with the mobile device, and so on. As an example, process 400 enables a front camera at the mobile device to capture photographs/images every 0.20 seconds. The mobile device may store one or more captured photographs/images. In several embodiments, process 400 captures a photograph/image, scans the captured images, and attempts to process the image to extract values of one or more parameters. When process 400 is unable to process the captured image, it can loop back to capture another image at, for example, 0.20 seconds intervals until it positively processes a sufficient number of images (and/or until process 400 times out).

Figure 4B:
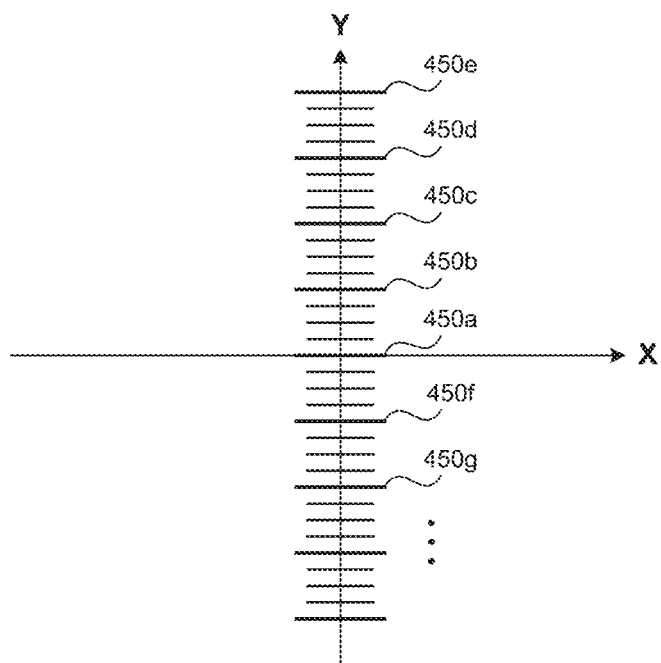
FIGS. 4B-4C are display diagrams illustrating examples of scanning light beams using a camera at a mobile device.
Figure 4C:
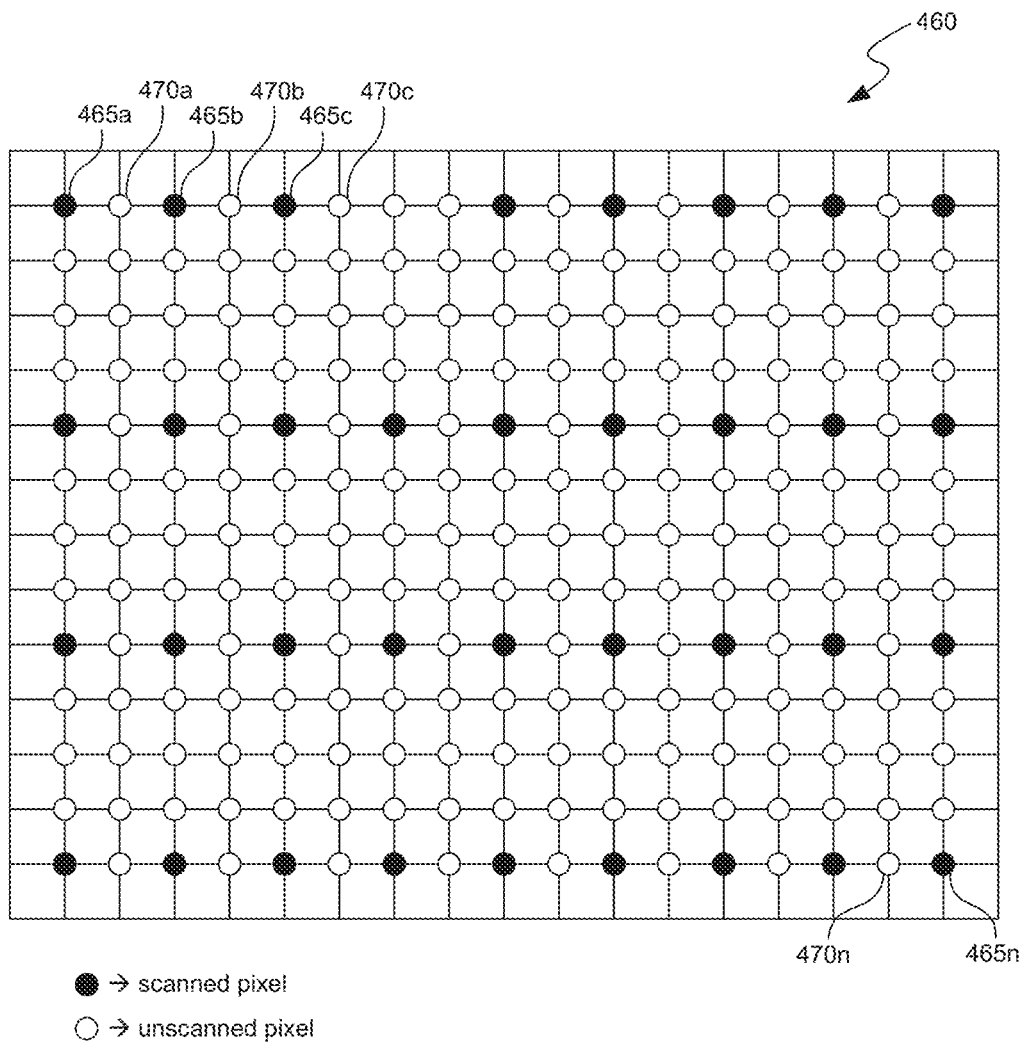

At block 410, process 400 scans the captured image. In several embodiments, process 400 does not scan each pixel of the captured image. Instead, process 400 scans or selects every x pixel (for example, every fourth pixel) of the captured image vertically. The number and frequency of pixels scanned by process 400 can be based on one or more parameters, such as specification/attributes of the mobile device, value of items associated with a barcode that is to be displayed, merchant whose barcode is to be displayed, location of mobile device, user of mobile device, telecommunications network associated with the mobile device, and so on. FIGS. 4B and 4C are display diagrams illustrating an example of scanning light beams using a camera at a mobile device in accordance with embodiments disclosed herein. For example, as illustrated in FIG. 4B, process 400 scans every fifth pixel of the captured image vertically 405a, 405b, 405c, 405d, 405e, 405f, 405g, and so on. As another example, FIG. 4C illustrates that process 400 scans every fourth pixel of the captured image 460 vertically and every second pixel of the captured image horizontally (465a, 465b, 465c, . . . , 465n). Process 400 does not scan other pixels (for example, 470a, 470b, 470c, . . . 470n) of the captured image 460 to optimize computing, processing, and/or storage capabilities of the mobile device.

At block 415, process 400 extracts values of one or more image data properties from the scanned pixels. Examples of image data properties include, but are not limited to brightness, bit depth, luminance, color, color space, intensity/luminosity, hue, tint, saturation, shade, tone, lightness, chromatic signal, grayscale, and so on. In several embodiments, process 400 determines the set of image data properties to be extracted from the scanned pixels based on one or more parameters, such as specification/attributes of the mobile device, value of items associated with a barcode that is to be displayed, merchant whose barcode is to be displayed, location of mobile device, user of mobile device, telecommunications network associated with the mobile device, and so on. For example, for a barcode associated with a high value item (for example, tickets for a sought-after concert) or a high security item (for example, airline tickets), process 400 may extract values of a greater number of image data properties than the values that might be extracted for a low value item (for example, a coupon for free ice-cream).

At block 420, process 400 compares the extracted values of image properties of scanned pixels with values of properties of one or more light sources. Examples of comparison light sources include, but are not limited to, light sources that emit light beams in the form of red laser light, green laser light, blue laser light, yellow laser light, infrared light, and so on (for example, a laser barcode scanner). For example, process 400 compares the extracted color and brightness values of the scanned pixels with the expected color and brightness values associated with a red laser light barcode scanner. In several embodiments, the expected values of properties of the light sources comprise a range of values (for example, for a red laser light source, the expected color values can be in a range instead of a single color value). In several embodiments, common barcode scanners could be tested to derive acceptable ranges of values.

At block 425, process 400 determines whether the extracted values of image properties of scanned pixels match the values (or fall within the range of values) of corresponding properties of the one or more light sources. In several embodiments, process 400 evaluates whether a threshold number of the extracted values of image properties of scanned pixels match the values of corresponding properties of the one or more light sources based on one or more parameters, such as specification/attributes of the mobile device, value of items associated with a barcode that is to be displayed, merchant whose barcode is to be displayed, location of mobile device, user of mobile device, telecommunications network associated with the mobile device, and so on. For example, for a barcode associated with a high value item (for example, tickets for a sought-after concert) or a high security item (for example, airline tickets), process 400 seeks a match for values of a greater number of image data properties than the number of values matched for a low value item (for example, a coupon for free ice-cream). In several embodiments, process 400 allows for a degree of error when performing the comparison and evaluating a match. For example, upon detecting that the ambient light around the mobile device is low, process 400 can allow for a 10% error when determining whether the brightness value of the scanned pixels match the brightness value of the light sources.

When process 400 detects a match at block 430 (for example, a match within certain threshold parameters), it then displays a barcode, or identifies and retrieves a barcode among a set of barcodes. For example, based on the information currently being displayed on the mobile device (for example, a certain mobile application page or webpage), process 400 may retrieve a corresponding barcode for that displayed information. As an example, when the mobile device is displaying information related to a merchant and process 400 detects and matches an appropriate light source being shone on the mobile device, process 400 can then retrieve a barcode associated with that particular merchant.

At block 435, process 400 displays the retrieved barcode at a display screen of the mobile device. In several embodiments, process 400 displays the retrieved barcode in a superimposed manner with the currently displayed information at the mobile device (for example, as discussed later in reference to FIG. 5C). When process 400 does not detect a match, it prevents the display of the barcode (for example, by returning to block 405), thus deterring digital barcode fraud. In several embodiments, process 400 is repeated iteratively such that the digital barcode is displayed at the mobile device as long as it continues to detect a match between extracted values of image properties of scanned pixels and values of corresponding properties of the one or more light sources.

Figure 5A:
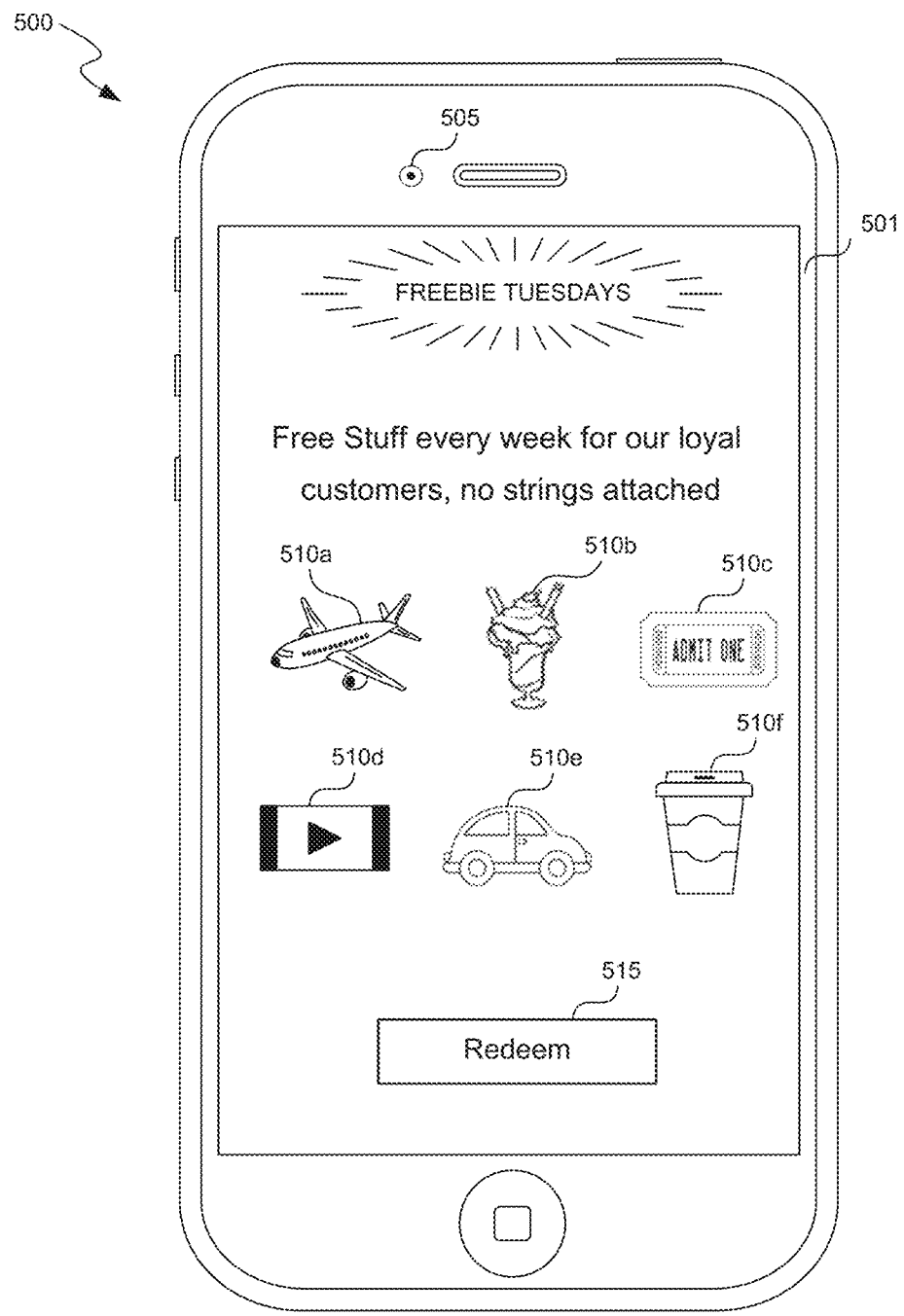
FIGS. 5A-5C are display diagrams illustrating example user interfaces for viewing a barcode for redeeming an offer.
Figure 5B:
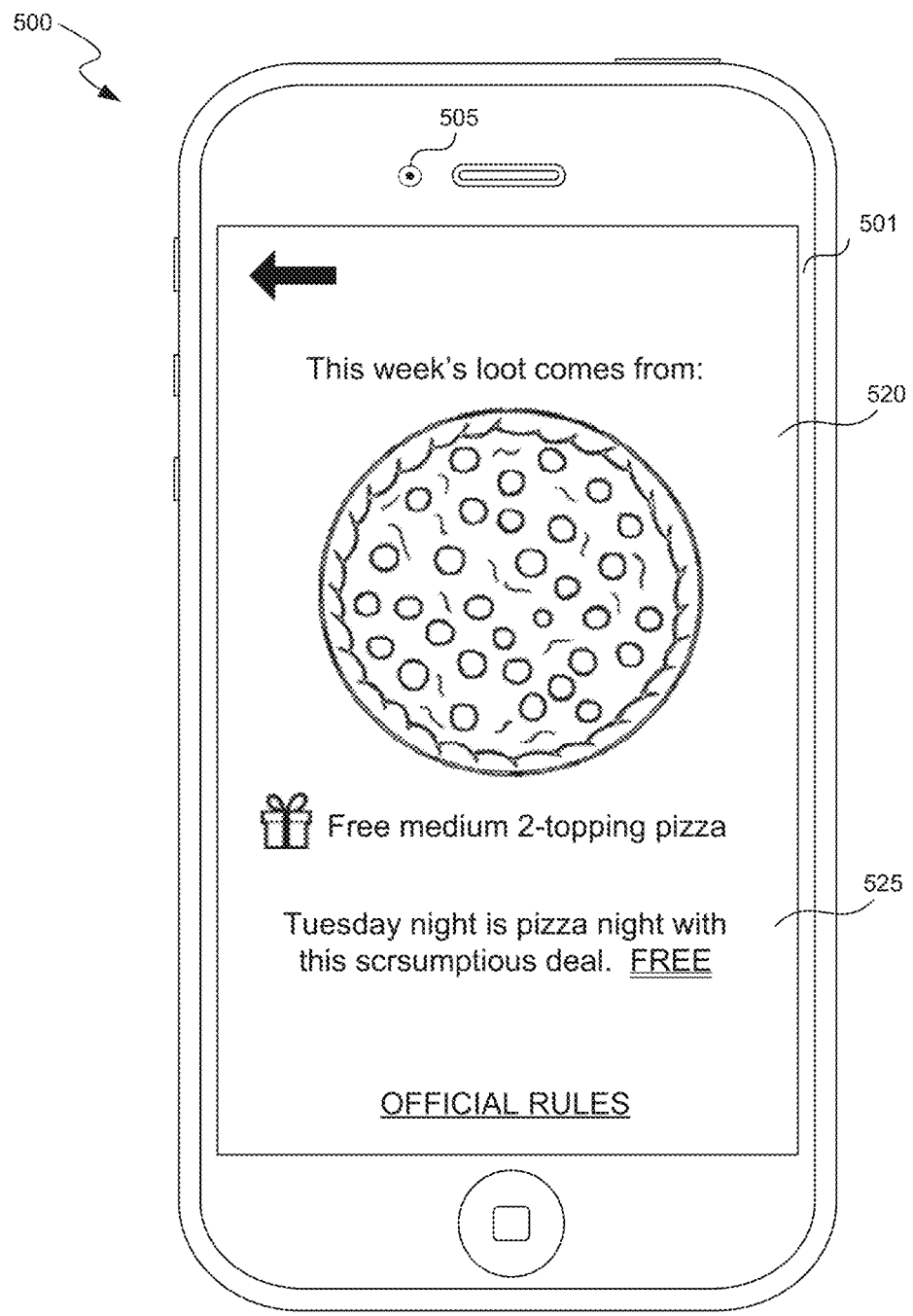
Figure 5C:
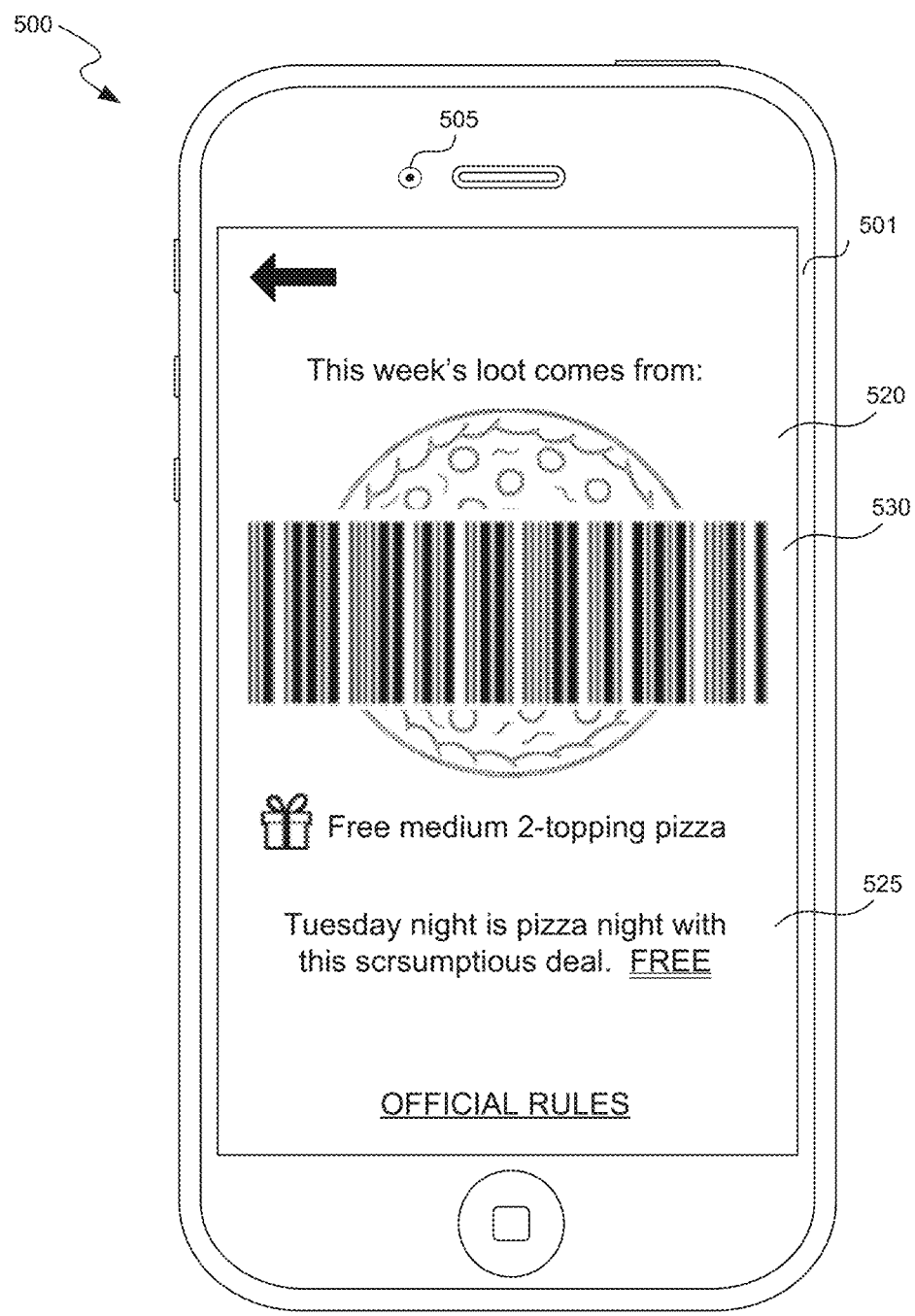

FIGS. 5A-5C are display diagrams illustrating example user interfaces for viewing a barcode (for example, to redeem an offer) on a mobile device 500 in accordance with embodiments disclosed herein. As illustrated in FIG. 5A, mobile device 500 comprises a camera (for example, front camera 505) and a display screen 501 that comprises an example interface for showing various offers available to a mobile user relating to different industry segments, such as airlines 510*a*, restaurants 510*b*, movie theaters 510*c*, video services 510*d*, automobiles 510*e*, coffee shops 510*f*, etc. The user interface further enables the mobile user to redeem one or more displayed offers via action buttons (for example, "redeem" action button 515) and/or selecting one or more of the displayed offers themselves. Upon receiving a selection of an offer, mobile device 500 can display information about the selected offer. For example, as illustrated in FIG. 5B, display screen 501 displays information about the item being offered 520 and the terms of the offer 525. However, at this time, no barcode is displayed to redeem the offer. When the mobile device detects that the correct light source is shining light on the mobile device (for example, using the process described in FIG. 4A), mobile device 500 displays a barcode 530 corresponding to the displayed offer. In several embodiments, once a mobile user redeems the displayed offer using the displayed barcode 530, mobile device may not display the barcode again (to prevent reuse of the barcode).

In several embodiments, the mobile device 200 may display one or more barcodes based upon detection of a specific type of laser light and one or more other parameters, such as location of mobile device, proximity of mobile device to other devices (for example, a control beacon, a telecommunications cell tower/transmitter, other mobile devices, etc.), user of mobile device, active profile at mobile device, current events, time of day, and so on. For example, mobile device 200 may display a barcode associated with an issued airline ticket (and/or a boarding pass) only when it detects a specific type of laser light employed by TSA agents and/or when the mobile device determines that it is geographically located at (or near) an airport. As another example, mobile device 200 may display a barcode associated with a concert ticket only when it detects a red laser light is being shone on the device, that the mobile device is located at (or near) a concert venue, and that the current time is within a threshold time of the concert to which the concert ticket applies.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

The invention claimed is:

1. A computer-implemented method for displaying a barcode at a mobile device, the method comprising:
   capturing, via a camera of the mobile device, a set of images every particular time interval,
   wherein each image in the set of images comprises data emitted by at least one comparison light source of a barcode reader;
   selecting, by at least one processor of the mobile device, a portion of image data of at least some images in the captured set of images;
   extracting, by the at least one processor of the mobile device, values for a set of parameters associated with the selected image data of the at least some images in the captured set of images;
   comparing, by the at least one processor of the mobile device, the extracted values for at least one parameter from the set of parameters to parameter values for the at least one comparison light source; and
   based on a positive comparison, displaying a barcode on a display screen of the mobile device.

2. The method of claim 1, wherein the particular time interval is based at least on:
   specification/attributes of the mobile device,
   value of an item associated with the barcode that is to be displayed,
   properties of a merchant whose barcode is to be displayed,
   location of the mobile device,
   user of the mobile device,
   telecommunications network associated with the mobile device,
   or any combination thereof.

3. The method of claim 1, wherein the camera is a front camera integrated in the mobile device and wherein the front camera is located next to the display screen of the mobile device.

4. The method of claim 1, wherein the at least one comparison light source emits light beams in the form of:
   red laser light,
   green laser light,
   blue laser light,
   yellow laser light,
   infrared light, or
   any combination thereof.

5. The method of claim 1, wherein the set of parameters comprises brightness, luminance, color, intensity, or any combination thereof.

6. The method of claim 1, wherein the extracted values of the parameters in the set of parameters associated with at least one comparison light source comprise a range of values associated with particular light sources.

7. The method of claim 1, wherein the barcode is displayed at the display screen of the mobile device only while the positive comparison occurs.

8. The method of claim 1, wherein the positive comparison occurs when a threshold number of the extracted values for the at least one parameter from the set of parameters are within a value threshold of the parameter values for the at least one comparison light source.

9. The method of claim 1, wherein when there is no positive comparison, the method further comprises:
   instructing the mobile device to stop displaying the barcode on the display screen of the mobile device.

10. The method of claim 1, further comprising:
    determining a location of the mobile device, wherein the barcode is displayed when the determined location of the mobile device is within a threshold distance of a target location associated with the barcode.

11. The method of claim 1,
    wherein the barcode is associated with an item being displayed on the display screen of the mobile device, and wherein display screen displays both the barcode and the item in a superimposed way.

12. The method of claim 1,
wherein the positive comparison occurs when a threshold number of the extracted values for the at least one parameter from the set of parameters are within a value threshold of the parameter values for the at least one comparison light source,
wherein the barcode is associated with an item being displayed on the display screen of the mobile device, and
wherein the threshold number depends on a value of the item associated with the barcode.

13. At least one non-transitory computer-readable memory carrying instructions to be executed by at least one processor, wherein the instructions are to perform a method for displaying a barcode at a mobile device, the method comprising:
  capturing, via a camera of the mobile device, a set of images every particular time interval,
  wherein each image in the set of images comprises data emitted by at least one comparison light source of a barcode reader;
  selecting, by at least one processor of the mobile device, a portion of image data of at least some images in the captured set of images;
  extracting, by the at least one processor of the mobile device, values for a set of parameters associated with the selected image data of the at least some images in the captured set of images;
  comparing, by the at least one processor of the mobile device, the extracted values for at least one parameter from the set of parameters to parameter values for the at least one comparison light source; and
  based on a positive comparison, displaying a barcode on a display screen of the mobile device.

14. The at least one non-transitory computer-readable memory of claim 13, wherein the particular time interval is based at least on:
  specification/attributes of the mobile device,
  value of an item associated with the barcode that is to be displayed,
  properties of a merchant whose barcode is to be displayed,
  location of the mobile device,
  user of the mobile device,
  telecommunications network associated with the mobile device, or any combination thereof.

15. The at least one non-transitory computer-readable memory of claim 13, wherein the at least one comparison light source emits light beams in the form of:
  red laser light, green laser light, blue laser light, yellow laser light, infrared light, or any combination thereof.

16. The at least one non-transitory computer-readable memory of claim 13, wherein the set of parameters comprises brightness, luminance, color, intensity, or any combination thereof.

17. The at least one non-transitory computer-readable memory of claim 13, wherein the positive comparison occurs when a threshold number of the extracted values for the at least one parameter from the set of parameters are within a value threshold of the parameter values for the at least one comparison light source.

18. The at least one non-transitory computer-readable memory of claim 13, wherein when there is no positive comparison, the method further comprises:
  instructing the mobile device to stop displaying the barcode on the display screen of the mobile device.

19. A mobile device configured to display a barcode, the mobile device comprising:
  at least one hardware processor;
  at least one non-transitory memory, coupled to the at least one hardware processor and storing instructions, which when executed by the at least one hardware processor, perform a process, the process comprising:
  capturing, via a camera of the mobile device, a set of images every particular time interval,
  wherein each image in the set of images comprises data emitted by at least one comparison light source of a barcode reader;
  selecting, by the at least one hardware processor of the mobile device, a portion of image data of at least some images in the captured set of images;
  extracting, by the at least one hardware processor of the mobile device, values for a set of parameters associated with the selected image data of the at least some images in the captured set of images;
  comparing, by the at least one hardware processor of the mobile device, the extracted values for at least one parameter from the set of parameters to parameter values for the at least one comparison light source; and
  based on a positive comparison, displaying a barcode on a display screen of the mobile device.

20. The mobile device of claim 19, wherein the particular time interval is based at least on:
  specification/attributes of the mobile device,
  value of an item associated with the barcode that is to be displayed,
  properties of a merchant whose barcode is to be displayed,
  location of the mobile device,
  user of the mobile device,
  telecommunications network associated with the mobile device,
  or any combination thereof.

* * * * *